INVENTOR
De Witt R. Goddard
BY
ATTORNEY

Patented June 26, 1945

2,379,293

UNITED STATES PATENT OFFICE 2,379,293

RATE-OF-CLIMB INDICATOR

De Witt Rugg Goddard, Riverhead, N. Y., assignor to Radio Corporation of America, a corporation of Delaware Application March 25, 1942, Serial No. 436,103

8 Claims. (Cl. 73—179)

This invention relates to indicators for use in aerial navigation, and it relates more particularly to a rate-of-climb indicator.

I am aware that many devices have been used in the past for indicating the rate-of-climb and descent of aircraft but it has not always been possible to make these devices sufficiently sensitive or of sufficiently light weight and simplicity to be practical.

Accordingly, it is an object of my invention to provide a rate-of-climb indicator which shall be extremely sensitive to changes in elevation and which shall be of extreme simplicity of construction.

It is another object of my invention to provide a rate-of-climb indicator of the fewest possible parts, of light weight, and having substantially no mechanism which would require any servicing.

In carrying out my invention, I have found it desirable to employ a substantially air-tight chamber for confining an atmosphere in such manner that it is subject to slow variations in barometric pressure and tends to equalize that of the outside atmosphere; communication therebetween being obtained only through a bleeder tube of restricted cross-section. At each end of this tube I mount one of two resistance elements which have the same high temperature coefficient of elctrical resistance. One of these resistances is mounted inside of the air-tight chamber and the other one outside. The two resistances constitute impedances in series-arms of a Wheatstone bridge arrangement. The parallel arms which complete the Wheatstone bridge may be any suitable resistors. A galvanometer is connected across the mid-points of the bridge and a direct current source is connected to the terminals of the bridge.

As is well known, a blast of air when subjected to compression imparts heat to objects placed in the air stream. Also, when subjected to expansion, the air absorbs heat. A difference in pressure of the air passing over two heated electrical resistors develops a corresponding difference between their resistance values if they possess a high temperature coefficient. The consequent unbalancing of the Wheatstone bridge, therefore, causes the galvanometer to indicate the velocity of the air stream passing through the orifice for equalizing the barometric pressures within and without the air-tight chamber. The galvanometer scale is preferably calibrated to indicate the rate of climb or descent in feet per minute, or in other units, if desired.

Figure 1:
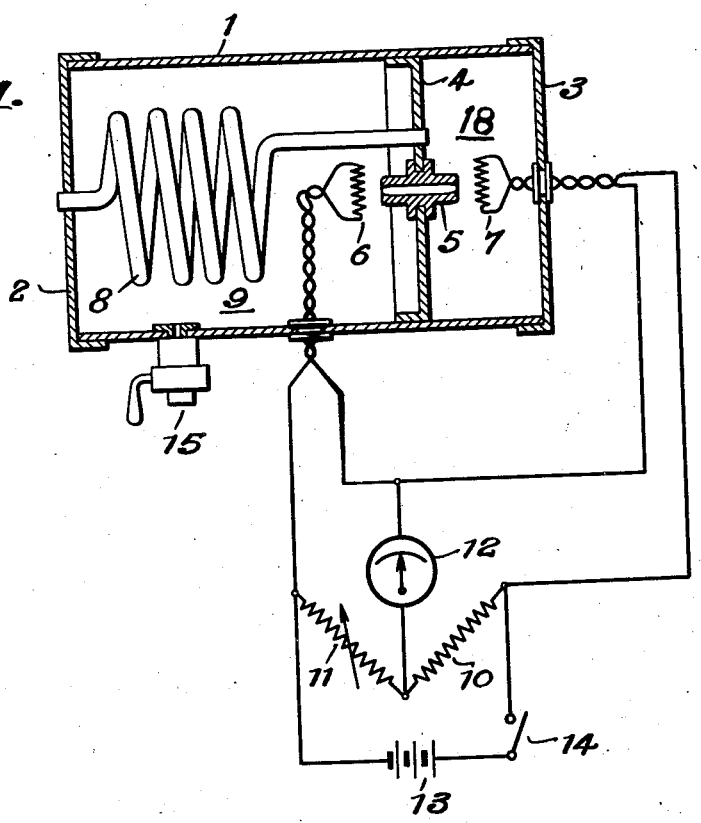
Figure 2:
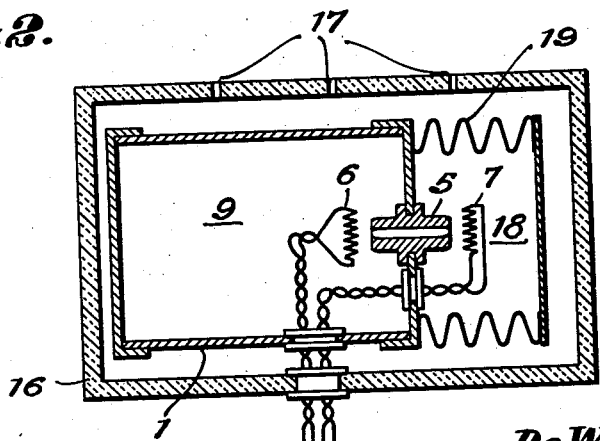

My invention will now be described in more detail, reference being made to the accompanying drawing. in which:

Fig. 1 shows the essential elements of construction of a preferred embodiment of my invention. and Fig. 2 shows a constructional modification of a portion of my apparatus.

Referring first to Fig. 1, I show therein a container having a cylindrical wall 1 and two end caps 2 and 3. Within the container is a partition wall 4, separating two chambers 9 and 18. This partition wall is pierced by a short tubular member, or bushing 5. The orifice through this tubular member is quite restricted so that air flow in either direction will play upon the two resistance elements 6 and 7. These resistance elements may be mounted in any suitable manner (not shown).

The barometric pressure in the chamber 18 to the right of the partition wall 4 is caused to vary with that of the outside atmosphere in which the aircraft is flying. Communication between the inside and outside atmospheres is obtained by means of a coiled pipe 8. One end of this pipe is exposed to the outside atmosphere and the other opens into chamber 18. The main part of the coil 8 is housed in the chamber 9, however, in order that the temperature of the outside air flowing inwardly to chamber 18 may be equalized with that of chamber 9. The inside diameter of tube 8 is such that there is no appreciable lag in the adjustment of barometric pressure in the chamber 18 to that of the outside air.

The elements 6 and 7 are of a very fine wire of suitable material to exhibit a high temperature coefficient of electrical resistance. Among the materials which may be so used are platinum, lead, silver, copper, and certain alloys, especially brass. Iron wire can be used, but in the embodiment shown in Fig. 1 it is not recommended. Iron might well be used in the embodiment which is presently to be described as shown in Fig. 2.

The circuit connections of the elements 6 and 7 to the terminals and an intermediate point on the Wheatstone bridge are clearly shown in Fig. 1. The parallel arms of this bridge circuit include a fixed resistor 10 and an adjustable resistor 11 for controlling the zero setting of the galvanometer pointer. A battery 13 is indicated in a circuit with a switch 14 for supplying power to the four resistors of the Wheatstone bridge.

In the operation of my invention, as shown in Fig. 1, the rate of climb of the air craft on which the indicator is mounted is determined by a reading on the galvanometer 12 due to the flow of air through the orifice 5. This air flows out of the chamber 9 and against the resistor 7. An air jet is formed by the orifice through the tube 5 and this jet has a greater cooling effect on resistor 7 than the vortex which surrounds the resistor 6. Furthermore, as the air expands it absorbs heat from the resistor 7 more rapidly than when it is under pressure, that is, while it surrounds the resistor 6. This cooling effect reduces the resistance of the element 7. This unbalances the bridge and causes an indication to be made on the galvanometer 12 which is substantially a linear deflection with respect to the rate of outflow of air from the chamber 9.

Conversely, in the case of descent, air will enter the chamber 18 by way of the tube 8 and will pass inwardly through the orifice 5 to increase the pressure inside the chamber 9. Since the pressure in this case is greater on the outside of the chamber 9 than inside, expansion of the atmosphere in the vicinity of the resistor 6, as well as the force of the air jet, will cause cooling of this element more rapidly than the cooling of resistor 7. Unbalancing of the Wheatstone bridge is, therefore, produced in the opposite direction for indicating descent.

After making a very rapid climb or descent, it may desirable to equalize the pressure inside and outside of the chamber 9 more rapidly than can be done by waiting for the air to pass through the orifice 5. In this case, a valve 15 may be opened momentarily.

Referring now to Fig. 2 I show a modification in which the atmosphere-confining container 1 is mounted in a heat insulating jacket 16. The insulating jacket has a number of holes 17 therein for equalizing the barometric pressure inside and out.

In this embodiment of Fig. 2, the orificed-bushing 5 is mounted in the end wall of the chamber 9. A housing for chamber 18 is attached to one end of the container 1 and is arranged to be variable in cubic capacity by means of metallic or other resilient bellows 19. The entire atmosphere or gas within the two chambers 9 and 18 may be permanently sealed therein. In this case, therefore, it is possible to use an inert gas, or a gas such as hydrogen or neon, which would have no corrosive effect upon the resistors 6 and 7. Accordingly, in this embodiment, I prefer to use very fine iron wire in constructing these resistors, since iron has a very high temperature coefficient of electrical resistance.

In the operation of my invention according to the modification shown in Fig. 2, the outside atmosphere communicates with the atmosphere within the insulating jacket 16 through the orifices 17 and causes the barometric pressure inside the chamber 18 to be substantially equalized with that of the ambient atmosphere. If the aircraft is climbing, then a greater pressure will cause a blast of gas to be ejected against the resistor 7, and upon expansion of this gas, the temperature of the element 7 is reduced more than that of element 6. Conversely, in the case of a descent, the bellows 19 will collapse, forcing the atmosphere inwardly through the orifice 5 and against the resistor 6 inside the chamber 9. Element 6 will, therefore, be cooled more rapidly than element 7 and the needle of the galvanometer 12 will be deflected in the proper direction for indicating the rate of descent.

It will be apparent to those skilled in the art that various other modifications of my invention may be made without departing from the spirit and scope of the invention itself. Various advantages of using a rate-of-climb indicator in accordance with my invention will also be appreciated by those who are familiar with rate-of-climb indicators generally, and need not be more particularly pointed out. The scope of the invention is, therefore, limited only in accordance with the claims.

I claim:

1. A rate-of-climb indicator for aircraft comprising a pair of resistance elements having a relatively high temperature coefficient, a container of fixed volume within which one of said elements is mounted, a collapsible container in which the other of said elements is mounted, an orificed bleeder member extending through a partition wall between said containers, the orifice of said member being opposed to said resistive elements, and electrical indicating means connected to said resistive elements for denoting differences between impedance values of the two said elements due to differences in the rate of heat transfer from said elements to the respective atmospheres by which they are surrounded.

2. A device in accordance with claim 1 in which said electrical indicating means is constituted as a galvanometer in a Wheatstone bridge circuit, and said resistive elements constitute two of the bridge arms.

3. A rate-of-climb indicator for aircraft comprising a container having two compartments separated by a partition wall for substantially confining at atmosphere at two different barometric pressures, one of said compartments being collapsible, a bleeder tube extending through said partition wall and providing relatively slow equalization of said barometric pressures, a Wheatstone bridge circuit comprising four resistance arms, two of which arms are disposed at opposite ends of said bleeder tube and are constituted as resistors having a relatively high temperature coefficient, and means including an electrical instrument connected across junction points between the arms of said bridge for indicating an unbalance of impedance values of said resistors due to differences in the rate of heat transfer therefrom to the atmospheres surrounding the same.

4. An aerial navigation instrument for translating barometric pressure changes into electrical indications, said instrument comprising two resistors having a relatively high temperature coefficient, means operative upon the impress of a voltage across said resistors for comparing their impedance values, a container having two compartments, the first of said compartments being of fixed volume and the second compartment being of variable volume, means including an orificed member for slowly equalizing the barometric pressures within said compartments, said member having its orifice interposed between said resistors, and means including a collapsible wall at least partly enclosing the space within the second of said compartments for causing the barometric pressure therewithin to be rapidly equalized with that of the outside atmosphere, thereby to render the gas flow through said orifice dependent upon the rate of change of the outside barometric pressure and hence to vary the relative impedances of said resistors.

5. An instrument according to claim 4 and including heat insulating means surrounding said container.

6. An instrument according to claim 4 in which said containers are hermetically sealed against the outside atmosphere and the atmosphere therein consists of an inert gas.

7. In a device for indicating a rate of change in the barometric pressure of the surrounding atmosphere, a sealed container having rigid walls, a second sealed container having a collapsible wall, a bleeder tube arranged to permit the flow of gas out of one container and into the other, a Wheatstone bridge comprising four resistance arms, two of said arms being disposed at opposite ends of said bleeder tube and being constituted as resistors having a relatively high temperature coefficient, a source of current connected to said bridge whereby considerable heat is generated in said resistors having a high temperature coefficient, and an electrical instrument so connected across junction points between the bridge arms as to indicate an unbalance of impedance values therein, the degree of said unbalance being a function of the rate of heat transfer from one of said resistors to a relatively attenuated atmosphere and from the other of said resistors to a relatively compressed atmosphere.

8. Apparatus for determining the rate of climb or descent of an aircraft, comprising a galvanometer, a pair of resistors each having the same predetermined high temperature coefficient, means for confining a fixed mass of gas partly at a barometric pressure equal to that through which said aircraft has traveled at a previous moment, and partly at a barometric pressure equal to that through which said aircraft is instantly traveling, said means comprising the walls of two intercommunicating chambers, a bleeder tube providing jet flow of said gas from one to the other of said chambers whenever the pressures therein are unequal, said resistors being disposed at opposite ends of said bleeder tube, whereby they are subjected to unequal heat transfer due to the compression and expansion of the gas as it enters and leaves the bleeder tube, the measure of inequality of heat transfer being a function of the rate of climb or descent of said aircraft, and means for causing said galvanometer to indicate that measure of inequality as a function of the resultant difference between the impedance values of said resistors.

DE WITT RUGG GODDARD.